Dec. 15, 1936.   H. E. IVES   2,064,475
ELECTROOPTICAL SCANNING SYSTEM
Filed May 6, 1932
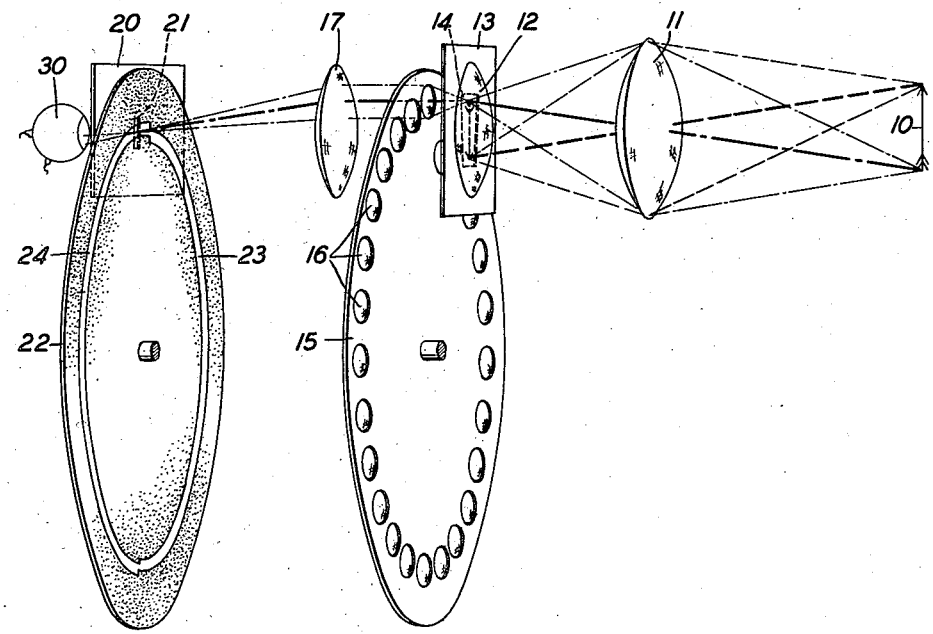
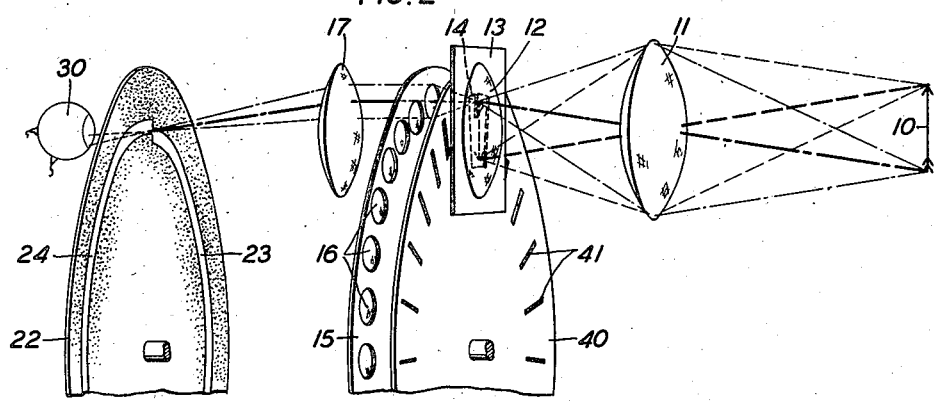
INVENTOR
H. E. IVES
BY
ATTORNEY Patented Dec. 15, 1936

2,064,475

UNITED STATES PATENT OFFICE 2,064,475

ELECTROOPTICAL SCANNING SYSTEM

Herbert E. Ives, Montclair, N. J., assignor to Bell Telephone Laboratories, Incorporated, New York, N. Y., a corporation of New York Application May 6, 1932, Serial No. 609,566

12 Claims. (Cl. 178—6)

This invention relates to electro-optical scanning and more particularly to television systems.

An object of the invention is to provide a novel apparatus for improving the quality of electro-optically produced images.

Another object of the invention is to provide improved means for scanning so as to cause a substantial overlapping of the scanning paths.

This invention is particularly adapted to systems of the type in which a stationary light sensitive means explores successively produced, slightly off-set moving images of a field of view, and similar arrangements for producing the image at the receiving station in which a light source takes the place of the light sensitive means.

In a patent to Pierre Mertz, 1,806,638, filed July 24, 1928 and granted May 26, 1931, a method and means for improving the quality of images produced electro-optically is disclosed. The specific arrangement shown in this patent is an apertured scanning disc, the apertures of which are in two sets of spirals so arranged that one complete scanning of the field of view by one set is effective to scan the entire field in contiguous lines and the second set is similarly effective during the succeeding scanning, there being a slight radial displacement of one set of apertures with respect to the other so that the scanning lines for one scanning are staggered with respect to those of the succeeding scanning. In such an arrangement the scanning disc is very large, since at least two sets of spirals, each scanning the entire field, are required as both the scanning and the staggering of the line series of elemental areas are performed by the scanning disc.

In accordance with the present invention only one spiral of apertures is required as the staggering of the line series of elemental areas is brought about by members cooperating with the scanning member. In the embodiment of the present invention herein chosen for purposes of illustration as applied, for example, to the transmitting station, a scanning disc is employed provided with spirally arranged apertures, each of which is equipped with a lens having its principal focus a given distance in front of the scanning disc. By means of a stationary optical system an image of the object being scanned is formed in the focal plane of the scanning lenses and in the field of view in front of the scanning disc. A second stationary lens system positioned in line with the field of view of the first mentioned optical system and at the rear of the scanning disc properly focusses in a given plane the moving images successively projected by the lenses in the scanning disc. In such a system successive images of the object being scanned are swept across a given plane or field and the paths of these images are successively transversely displaced by the lenses in the scanning disc being arranged in a spiral. In order that light from only one elemental area of these images may reach a light sensitive cell at any instant, an apertured member is positioned in the plane across which the images are swept. As each successive image is transversely displaced with respect to a preceding image, the above mentioned apertured member causes successive line series of elemental areas to be scanned during each revolution of the scanning disc or scanning cycle. The position of the aperture in the apertured member is periodically, slightly moved in a direction transverse to that of the scanning, thus causing a staggering of the scanning paths. An arrangement for defining and positioning this aperture consists of a stationary opaque plate having an elongated opening and a rotatable auxiliary disc having two or more slots or light transparent strips or paths of slightly different radii, these paths being circularly arranged in different sectors of the disc respectively and positioned to cross the opening in the stationary plate. This auxiliary disc is rotated, for example, when the disc has two circularly arranged paths each of 180° with a periodicity twice that of the lensed scanning disc and is so positioned with respect to the stationary apertured plate that, during one complete revolution of the lensed disc, light passing through one of the circular paths of the auxiliary disc and the opening in the stationary apertured plate and during the succeeding revolution of the lensed disc, light passes through the second circular path of the auxiliary disc and the opening in the stationary apertured plate, thus periodically changing the effective position of the resultant aperture. The radii and width of the paths in the auxiliary disc are so chosen that the light beams passing therethrough and the opening in the stationary apertured plate occupy positions which overlap any desired amount, preferably 50% when the auxiliary disc has two 180° paths. The width of the aperture in the stationary plate and the width of the light transmitting path in the auxiliary disc determine the size of an elemental area scanned at any instant and particularly whether the width of the line series of elemental areas is such that the image is completely scanned by contiguous paths in a single scanning cycle, while the periodic transverse displacement of the effective aperture causes the staggering of the scanning lines.

At the receiving station a similar arrangement may be used, a suitable light source taking the place of the light sensitive translating means, the beam from the light source being, if desired, concentrated by a stationary lens system in the region where the stationary apertured plate and slotted auxiliary disc operate.

The staggering or transverse displacement of the scanning lines may be obtained by positioning the rotating auxiliary disc having the curved light transmitting paths and the member having the transverse elongated aperture at different positions in the optical train, one such modification being shown in the drawing. Two crossing slotted members are shown for defining the effective aperture because of the ease with which the position of the effective aperture may be changed, rather than one member having an opening completely defining the effective aperture and means for shifting this member.

A more detailed description of the embodiment of the invention chosen for illustration follows:

Fig. 1 is a diagrammatic showing of the essential elements of the scanning system; and Fig. 2 a diagrammatic showing of a modification of the arrangement of Fig. 1.

The scanning system shown in Fig. 1 comprises an objective lens 11 which focusses an image of the object 10, which is being scanned, in the field of view defined by the opening 14 in the opaque plate 13 positioned immediately behind the lens 12 and in front of the scanning disc 15 in which is mounted a spiral of condensing lenses 16, having their principal axes parallel with the axes of rotation of the scanning disc. The lens 12 changes the direction of the light from the object so that the axes of the beams passing from the image to the scanning lenses 16 are parallel with the principal axes of these lenses. This lens 12 may be a planoconvex lens and it increases the efficiency with which the light from the image is received by the lenses in the scanning disc, directing the light beams from all parts of the image with equal advantage to the lenses in the scanning disc. The scanning lenses pass the field of view in succession and together with the collimating lens 17 sweep images of the field scanned across a fixed region in space at which is positioned a small aperture in front of a light translating element 30. In accordance with this invention the position of this aperture is slightly moved transversely at the end of each picture scanning period. The arrangement shown for varying the position of the aperture consists of a stationary opaque plate 20 having a narrow elongated or rectangular aperture 21, and a rotating opaque auxiliary disc 22 having narrow transparent circular strips or apertues 23 and 24 in the two halves of the disc and arranged to pass across the stationary aperture 21. The light transmitting openings in both the stationary plate 20 and the auxiliary disc 22 cross as nearly as practicable at the focus of the collimating lens 17. The circular strips 23 and 24 have slightly different radii, the difference being preferably one-half the width of the strips. The aperture 21 preferably has a width the same as the strips 23 and 24 and together they form a square effective scanning aperture or area. The image of an elemental area of the field of view on the auxiliary aperture formed by the stationary plate 20 and the auxiliary disc 22 through which light from an elemental area passes to the light translating device 30 is preferably larger than an elemental area of the image formed in the focal plane of the lens of the scanning disc. The auxiliary disc 22 is rotated at one-half the speed of the scanning disc 15 by any suitable well known means, though such means are not shown in the drawing, and consequently the effective aperture in the image plane in front of the light translating device 30 shifts at each alternate revolution of the scanning disc 15 and between an image change as caused by the scanning disc 15. The angular spacing between the first and last lens apertures in the spiral of lenses 16 is preferably sufficient to permit the change between strips 23 and 24 across aperture 21 to occur between image scanning cycles. This shifting of the effective scanning spot at each alternate revolution of the scanning disc 15 by half the width of the effective scanning spot causes the line series of elemental areas scanned across the field of view by the scanning condensing lenses 16 to be staggered with the result that a much better image is produced in a television receiver. This arrangement takes advantage of the possibility of selecting the part of the scanned image which is to be used, not at the scanning disc, but at the image of the scanning disc aperture which is formed by the lenses in the scanning disc and the collimating lens.

The modification of Fig. 1 shown in Fig. 2 employs a lens system substantially the same as that shown in Fig. 1, but employs a slotted disc to take the place of the stationary aperture plate. The light reaching the light sensitive cell at any instant is limited to a single elemental area by means of radial narrow strip apertures in the above mentioned slotted disc, one of which apertures is positioned in front of and at the focus of each scanning lens in the scanning disc and rotates therewith, cooperating with the circular light transmitting strips in the auxiliary disc. The slotted disc 40 having radial narrow rectangular rotatable apertures 41 symmetrically arranged in front of each of the scanning lenses 16 mounted in the scanning disc 15 is used instead of the stationary plate 20 having the narrow rectangular aperture 21 as shown in Fig. 1. The apertures 41 are located in the focal plane of the scanning lenses 16. An image of the object 10 is focussed by means of the objective lens 11 on the disc 40 and at any instant only a very narrow strip of the image, such as is defined by one of the narrow slots 41 is transmitted to a scanning lens 16 and from there through the collimating lens 17. An enlarged vertical image of an aperture 41 is thus formed across and travels along a portion of the circular strip or aperture 23 or 24 in the auxiliary disc 22 through which at any instant the light from an elemental area passes to the light sensitive cell 30. The lens 12 and the plate 13 having the opening 14 defining the viewing field serves the same purpose as described in connection with Fig. 1 and these members are placed as close as practicable to the disc 40. The apertures 41 limit the cross-sectional area of the beams of light emerging from the disc 40 to a narrow vertical rectangle. The emergent light passes to the auxiliary disc 22 where the transparent strips 23 and 24 cross it at right angles and thus permit the light from a single elemental area only to reach the light sensitive cell. The auxiliary disc 22 is rotated by any suitable means at one-half the speed of the scanning disc 15 and thereby shifts the effective scanning spot at each alternate revolution of the scanning disc 15 by one-half the width of the effective scanning spot, thus staggering the scanning lines.

In each of the arrangements the effective aperture is formed by the combination of two elements each of which have narrow light transmitting strips. These two strips may be placed in the optical train close together as shown, for example, in Fig. 1 or at quite different points as shown, for example, in Fig. 2 and in either case they may be readily arranged to so cooperate that the line series of elemental areas scanned across the image may be shifted as desired so as to cause the scanning lines to overlap.

A picture, for example, such as a moving picture film may be scanned by positioning it in the focal plane of the scanning condensing lens and properly illuminating it, as for example, by substituting for the field 10 a plate glow lamp of the type commonly used in television receiving systems. When a moving picture is scanned by a scanning disc having the condensing lenses spirally arranged the picture must be quickly advanced one frame at the end of each revolution of the scanning disc, but if the scanning condensing lenses are arranged in a circle the moving picture film may be moved at a uniform rate.

It is obvious that instead of employing two transparent portions only in the auxiliary disc 22, a larger number may be employed. Also, the off-set of one transparent portion with respect to another may be more or less than half the width of a scanning line. If three transparent portions are used, for example, the off-set of the first portion with respect to the second and the second with respect to the third might be made one-third of the width of a scanning line and the off-set of the third with respect to the first, two-thirds the width of a line. Similarly, the number of transparent sections may be increased further, as desired. When only two sections are used, or even when more are used, the scanning period of the system may be about that of the persistence of vision; or it may be reduced to improve the reproduction, but such reduction will result in an increase in the width of the frequency band transmitted from the sending to the receiving station unless the number of lines scanned per unit of time is correspondingly reduced.

The invention in its broader aspects is obviously of quite general application. It is defined in various aspects, in the appended claims.

By the term "aperture" as used in the claims is meant an optical aperture such as an opening or light transmitting means of restricted area.

What is claimed is:

1. Scanning apparatus comprising a moving scanning device, for scanning parallel elemental strips of a field of view in sequence, and means optically cooperating with said device for periodically and abruptly producing a sidewise shift in said scanning strips by an amount which causes an overlapping thereof while maintaining all of the scanning strips in substantially parallel relationship.

2. Electro-optical scanning apparatus comprising a moving scanning device, for scanning parallel elemental strips of a field of view in sequence, and means optically cooperating with said device for periodically and abruptly producing a sidewise shift in the scanning strips by an amount less than the width of a strip whereby overlapping is produced while maintaining all of the scanning strips in substantially parallel relationship.

3. An electro-optical scanning system comprising an apertured rotatable scanning member for scanning parallel elemental strips of a field of view in sequence, and means optically cooperating with said member for periodically and abruptly producing a sidewise shift in the scanning strips by an amount which causes an uninterrupted overlapping thereof and causes all of the scanning strips to be positioned in substantially parallel relationship.

4. An electro-optical scanning system comprising a rotatable scanning member provided with lens equipped apertures, for scanning parallel elemental strips of a field of view in sequence, and means optically cooperating with said member for periodically and abruptly producing a shift in said scanning strips in a direction transverse to said strips by an amount which causes an overlapping thereof while maintaining all of the scanning strips in substantially parallel relationship.

5. Scanning apparatus comprising a moving scanning device, for completely and repeatedly scanning a field of view in parallel elemental strips in sequence, and means in the path of the scanning light for cooperating optically with said device for periodically and abruptly producing a sidewise shift of said scanning strips to cause a partial and continuous lengthwise substantially parallel lapping of the strips of a complete scanning over strips respectively of a preceding scanning.

6. Scanning apparatus comprising a moving scanning device, for completely and repeatedly scanning a field of view in parallel substantially adjacent elemental strips in sequence, and means in the path of the scanning light cooperating optically with said device for periodically and abruptly producing a sidewise shift of said scanning strips at a periodicity equal to that of said complete scannings and by an amount which will cause a partial lapping of the individual strips of one scanning over strips of the preceding scanning while maintaining all of the scanning strips in substantially parallel relationship.

7. Scanning apparatus comprising a moving scanning device, for repeatedly scanning an entire field of view in parallel adjacent elemental strips in sequence, light obstructing means having a light aperture cooperating with said device and optically aligned therewith, and means for shifting the effective position of said aperture to produce a partial overlap of each of said scanned strips by another thereof, and to cause all of the scanning strips to be positioned in substantially parallel relationship.

8. Scanning apparatus comprising a moving scanning device for completely and repeatedly scanning a field of view in parallel elemental strips in sequence and means cooperating with said device for periodically and abruptly producing a sidewise shift of said scanning to cause a consecutive partial lapping of the strips of a complete scanning over the strips respectively of a preceding scanning while maintaining all of the scanning strips in substantially parallel relationship, said means comprising light obstructing means having an aperture optically aligned with said device and means for periodically and abruptly changing the effective position of said aperture.

9. Scanning apparatus comprising movable scanning means carrying a series of light converging elements, for repeatedly scanning elemental strips of a field of view in succession, and means optically cooperating with said apparatus for periodically and abruptly producing a shift in a direction transverse to the scanned strips to cause a partial overlapping thereof and to cause all of the scanning strips to be positioned in substantially parallel relationship.

10. Scanning apparatus comprising movable scanning means carrying a series of light converging elements, for repeatedly scanning elemental strips of a field of view in succession equal in number to the number of said elements, and means cooperating with said apparatus for periodically producing a shift in the scanning in a direction transverse to the scanned strips to cause a partial overlapping thereof and to maintain all scanning strips in substantially parallel relationship, said last mentioned means comprising light obstructing means having an aperture and means for periodically and abruptly changing the effective position of said aperture.

11. Scanning apparatus comprising movable scanning means carrying a series of light converging elements for repeatedly scanning elemental strips of a field of view in succession equal in number to the number of said elements, and means cooperating with said apparatus for periodically producing a shift in the scanning in a direction transverse to the scanned strips to cause a partial overlapping thereof while maintaining all of the scanning strips in substantially parallel relationship, said last mentioned means comprising light obstructing means having an aperture and means for periodically and abruptly changing the effective position of said aperture, at a periodicity greater than that of individual strip scanning.

12. In an electro-optical system, means for repeatedly scanning elemental strips of a field of view, comprising a rotating disc member having spirally arranged apertures each of which is equipped with light converging means, a second rotating disc member concentric with said first member and rotatable therewith having narrow radial apertures respectively aligned with said light converging means, and a third rotating member having at least two narrow concentric circular light transmitting paths of slightly different radii for controlling the effective portions of said radially positioned apertures.

HERBERT E. IVES.